(12) United States Patent
Oohata

(10) Patent No.: US 11,067,052 B2
(45) Date of Patent: Jul. 20, 2021

(54) DEVICE FOR CONTROLLING INTERNAL COMBUSTION ENGINE AND METHOD FOR CONTROLLING INTERNAL COMBUSTION ENGINE

(71) Applicant: HITACHI AUTOMOTIVE SYSTEMS, LTD., Ibaraki (JP)

(72) Inventor: Eiichirou Oohata, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/646,893

(22) PCT Filed: Aug. 6, 2018

(86) PCT No.: PCT/JP2018/029346
§ 371 (c)(1),
(2) Date: Mar. 12, 2020

(87) PCT Pub. No.: WO2019/064932
PCT Pub. Date: Apr. 4, 2019

(65) Prior Publication Data
US 2021/0071631 A1    Mar. 11, 2021

(30) Foreign Application Priority Data

Sep. 29, 2017    (JP) .............................. JP2017-189871

(51) Int. Cl.
*F02P 5/14*    (2006.01)
*F02P 5/10*    (2006.01)

(52) U.S. Cl.
CPC .. *F02P 5/14* (2013.01); *F02P 5/10* (2013.01)

(58) Field of Classification Search
CPC ..................................... F02P 5/14; F02P 5/10
See application file for complete search history.

(56) References Cited

U.S. PATENT DOCUMENTS

| 5,247,919 A | 9/1993 | Akai et al. |
| 6,367,318 B1 | 4/2002 | Boyer et al. |

(Continued)

FOREIGN PATENT DOCUMENTS

| JP | H05-231292 A | 9/1993 |
| JP | 2001-153016 A | 6/2001 |

(Continued)

OTHER PUBLICATIONS

International Search Report for PCT/JP2018/029346, dated Nov. 20, 2018.

*Primary Examiner* — Hieu T Vo
(74) *Attorney, Agent, or Firm* — Volpe Koenig

(57) ABSTRACT

Provided is a control device of an internal combustion engine that reduces the number of times of discharge in multiple discharge by an ignition plug of the internal combustion engine and suppresses an error in fuel ignition by the ignition plug. The control device according to the present invention includes an ignition plug provided in a cylinder of an internal combustion engine, and an ignition control unit which has an ignition control function of controlling discharge (ignition) of the ignition plug and an ignition detection function of detecting ignition of an air-fuel mixture through ignition by the ignition plug. The ignition control unit is configured to stop ignition by the ignition plug on the basis of detection of ignition of the air-fuel mixture by the ignition plug.

8 Claims, 8 Drawing Sheets

(56) References Cited

U.S. PATENT DOCUMENTS

| | | | |
|---|---|---|---|
| 7,207,317 B2* | 4/2007 | Endou | F02P 5/152 |
| | | | 123/435 |
| 10,808,669 B2* | 10/2020 | Nakada | F02P 3/005 |
| 2004/0040535 A1 | 3/2004 | Miwa et al. | |

FOREIGN PATENT DOCUMENTS

| | | |
|---|---|---|
| JP | 2001-280229 A | 10/2001 |
| JP | 4939629 B2 | 5/2012 |

* cited by examiner

DEVICE FOR CONTROLLING INTERNAL COMBUSTION ENGINE AND METHOD FOR CONTROLLING INTERNAL COMBUSTION ENGINE

TECHNICAL FIELD

The present invention relates to a control device of an internal combustion engine and a method for controlling an internal combustion engine.

BACKGROUND ART

In recent years, to improve fuel efficiency of a vehicle, there is developed a control device of an internal combustion engine in which a technique of operation with an air-fuel mixture thinner than that according to a theoretical air-fuel ratio, or a technique of taking part of post-combustion exhaust gas is incorporated.

In this type of control device of the internal combustion engine, the amount of fuel and air in the combustion chamber deviates from the theoretical value, so that an error in fuel ignition by an ignition plug may occur. Thus, there is a method of suppressing an ignition error in which a chance of ignition of fuel by the ignition plug is increased by performing the discharge of the ignition plug a plural number of times (multiple discharge) in one combustion cycle. However, if the number of times of discharge of the ignition plug increases, wearing of the ignition plug is promoted and the life of the ignition plug is shortened.

PTL 1 discloses a control device of an internal combustion engine that reduces the number of times of discharge of the ignition plug in one combustion cycle.

CITATION LIST

Patent Literature

PTL 1: Japanese Patent No. 4939629

SUMMARY OF INVENTION

Technical Problem

In the technique disclosed in PTL 1, a relation between the pressure in a cylinder (in-cylinder pressure) and a rotation position of the internal combustion engine is acquired in advance. In a case where the rotation position reaches a multiple discharge end position, the multiple discharge in one combustion cycle is forcibly terminated.

However, in general internal combustion engines, there may be variations in gas flow and gas temperature in the combustion chamber. In such a case, in the control device of the internal combustion engine of PTL 1, even when the rotation position of the internal combustion engine reaches the multiple discharge end position, the ignition by the ignition plug may end with ignition error while fuel is not ignited through ignition by the ignition plug.

Therefore, the present invention has been made in view of the problem, and an object thereof is to provide a control device of an internal combustion engine that reduces the number of times of multiple discharge by the ignition plug of the internal combustion engine and suppresses an error in fuel ignition by the ignition plug.

Solution to Problem

In order to solve the above problems, a control device of an internal combustion engine includes an ignition device which is provided in a cylinder of the internal combustion engine, and an ignition control device which includes an ignition control unit to control ignition by the ignition device, and an ignition detection unit to detect ignition of an air-fuel mixture through ignition by the ignition device. The ignition control device stops ignition by the ignition device on the basis of detection of the ignition of the air-fuel mixture through ignition by the ignition device.

Advantageous Effects of Invention

According to this invention, there is provided a control device of an internal combustion engine that reduces the number of times of multiple discharge by an ignition plug of the internal combustion engine and suppresses an error in fuel ignition by the ignition plug.

DESCRIPTION OF EMBODIMENTS

Hereinafter, a control device 1 for an internal combustion engine according to an embodiment of the invention will be described. In the embodiment, the description will be given about a case where the control device 1 controls the discharge (ignition) of an ignition plug 200 provided in each cylinder 150 of a four-cylinder internal combustion engine 100.

Hereinafter, in the embodiment, a combination of some or all of the configurations of the internal combustion engine 100 and some or all of the configurations of the control device 1 will be referred to as the control device 1 of the internal combustion engine 100.

[Internal Combustion Engine]

Figure 1:
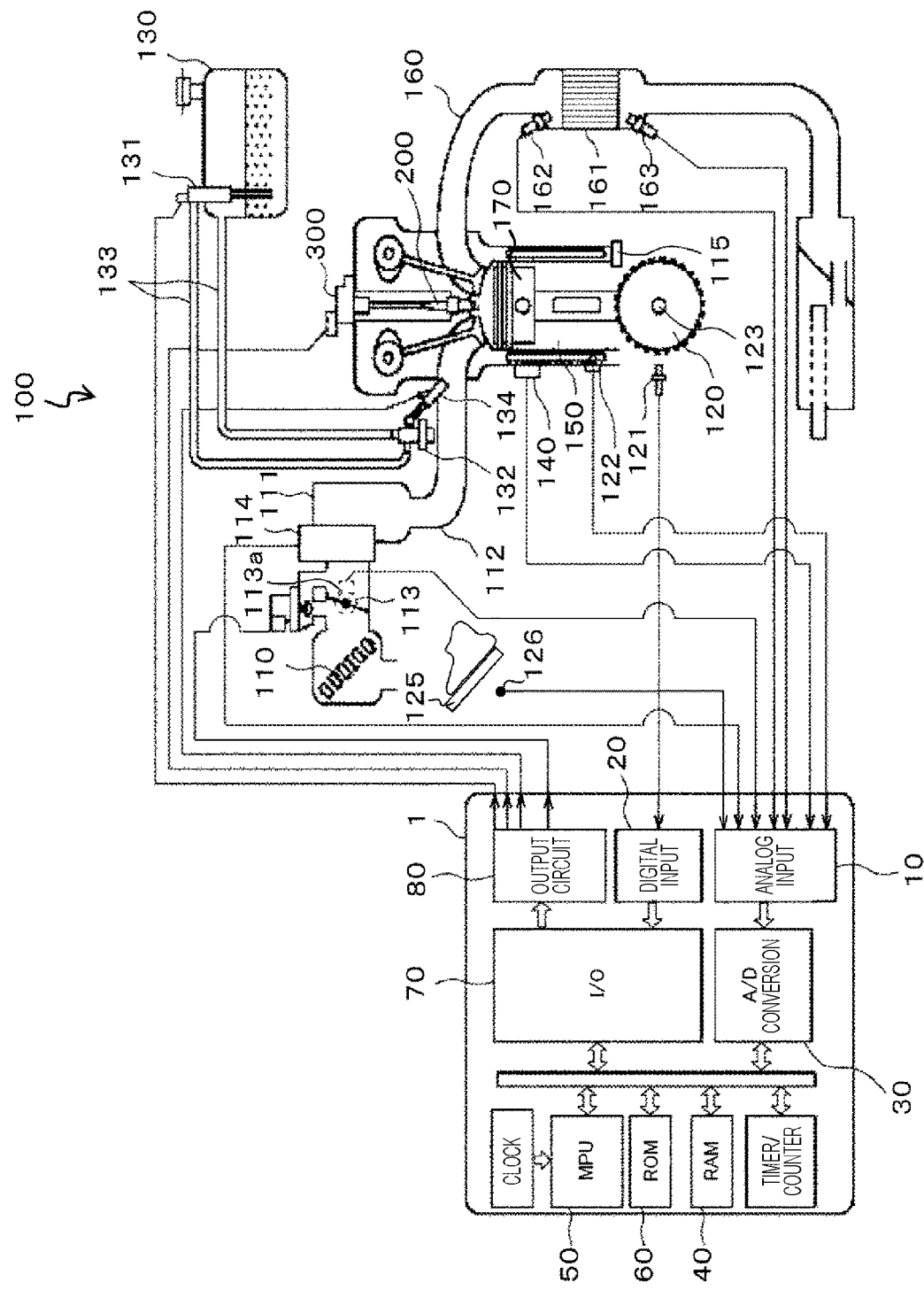
FIG. 1 is a diagram for describing a configuration of main parts of an internal combustion engine and a control device of the internal combustion engine according to an embodiment.

FIG. 1 is a diagram illustrating the configuration of main parts of the internal combustion engine 100 and the control device 1 for the internal combustion engine.

Figure 2:
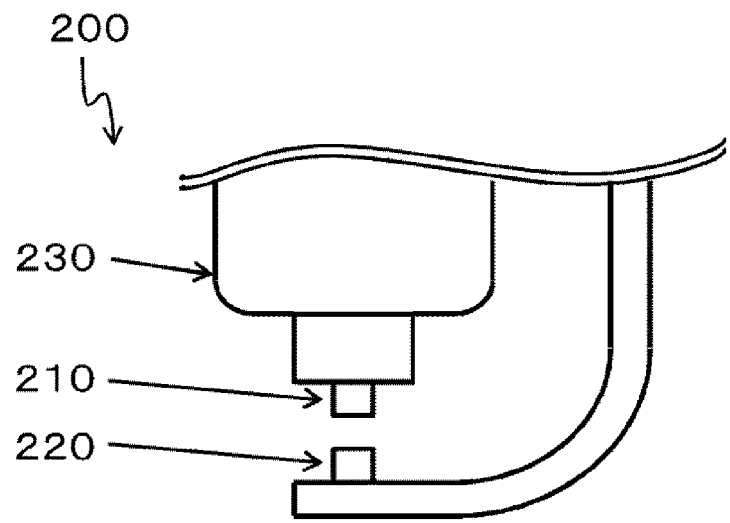
FIG. 2 is a partially enlarged view for describing an ignition plug.

FIG. 2 is a partially enlarged view illustrating electrodes 210 and 220 of the ignition plug 200.

In the internal combustion engine 100, air sucked from the outside flows through an air cleaner 110, an intake pipe 111, and an intake manifold 112, and flows into each cylinder 150. The amount of air flowing into each cylinder 150 is adjusted by a throttle valve 113, and the amount of air adjusted by the throttle valve 113 is measured by a flow sensor 114.

The throttle valve 113 is provided with a throttle opening sensor 113a for detecting the opening of the throttle, and opening information of the throttle valve 113 detected by the throttle opening sensor 113a is output to the control device (Electronic Control Unit: ECU) 1.

An electronic throttle valve driven by an electric motor is used as the throttle valve 113. However, any other types may be used as long as the air flow rate can be adjusted appropriately.

The temperature of the air flowing into each cylinder 150 is detected by an intake air temperature sensor 115.

A crank angle sensor 121 is provided on the outer side in the radial direction of a ring gear 120 attached to a crankshaft 123, and the crank angle sensor 121 detects a rotation angle of the crankshaft (not illustrated). In the embodiment, the crank angle sensor 121 detects the rotation angle of the crankshaft 123 every 10° and every combustion cycle.

A water temperature sensor 122 is provided in a water jacket (not illustrated) of the cylinder head, and the water temperature sensor 122 detects the temperature of the cooling water of the internal combustion engine 100.

In addition, a vehicle is also equipped with an accelerator position sensor (APS) 126 that detects the amount of displacement (depression amount) of an accelerator pedal 125. The accelerator position sensor 126 detects a torque required by a driver. The required torque detected by the accelerator position sensor 126 is output to the control device 1 described below. The control device 1 controls the throttle valve 113 on the basis of this required torque.

The fuel stored in a fuel tank 130 is sucked and pressurized by a fuel pump 131, then flows through a fuel pipe 133 provided with a pressure regulator 132, and is guided to a fuel injection valve (injector) 134. The fuel output from the fuel pump 131 is adjusted to a predetermined pressure by the pressure regulator 132 and injected into each cylinder 150 from the fuel injection valve 134. As a result of pressure adjustment by the pressure regulator 132, excess fuel is returned to the fuel tank 130 through a return pipe (not illustrated).

A cylinder head (not illustrated) of the internal combustion engine 100 is provided with a combustion pressure sensor (also referred to as a cylinder pressure sensor (CPS) or an in-cylinder pressure sensor) 140. The combustion pressure sensor 140 is provided in each cylinder 150 and detects the pressure (combustion pressure) in the cylinder 150.

The combustion pressure sensor 140 is a piezoelectric or gauge pressure sensor, and is configured to detect the combustion pressure (in-cylinder pressure) in the cylinder 150 over a wide temperature range.

Each cylinder 150 is provided with an exhaust manifold 160 that discharges the post-combustion gas (exhaust gas) to the outer side of the cylinder 150. A three-way catalyst 161 is provided on the exhaust side of the exhaust manifold 160, and the exhaust gas is purified by the three-way catalyst 161 and then discharged to the atmosphere.

An upstream air-fuel ratio sensor 162 is provided on an upstream side of the three-way catalyst 161. The upstream air-fuel ratio sensor 162 continuously detects the air-fuel ratio of the exhaust gas discharged from each cylinder 150.

A downstream air-fuel ratio sensor 163 is provided on a downstream side of the three-way catalyst 161. The downstream air-fuel ratio sensor 163 outputs a switch-like detection signal in the vicinity of the theoretical air-fuel ratio. In the embodiment, the downstream air-fuel ratio sensor 163 is an O2 sensor.

In addition, the ignition plug 200 is provided at the upper portion of each cylinder 150, and a spark ignites an air-fuel mixture in the cylinder 150 by the discharge (ignition) of the ignition plug 200. An explosion occurs in the cylinder 150 and a piston 170 is pushed down. When the piston 170 is pushed down, the crankshaft 123 rotates.

An ignition coil 300 that generates a voltage supplied to the ignition plug 200 is connected to the ignition plug 200, and the voltage generated by the ignition coil 300 causes discharging between a center electrode 210 and an outer electrode 220 of the ignition plug 200 (see FIG. 2).

As illustrated in FIG. 2, in the ignition plug 200, the center electrode 210 is supported in an insulated state by an insulator 230, and a predetermined voltage (20,000 V to 40,000 V in the embodiment) is applied to the center electrode 210.

The outer electrode 220 is grounded and, when a predetermined voltage is applied to the center electrode 210, discharge (ignition) occurs between the center electrode 210 and the outer electrode 220.

Further, in the ignition plug 200, a voltage at which discharge (ignition) occurs due to dielectric breakdown of the gas component varies depending on the state of gas existing between the center electrode 210 and the outer electrode 220 and the in-cylinder pressure. The voltage at which this discharge occurs is called a breakdown voltage Vm.

Returning to FIG. 1, output signals from various sensors such as the throttle opening sensor 113a, the flow sensor 114, the crank angle sensor 121, the accelerator position sensor 126, the water temperature sensor 122, and the combustion pressure sensor 140 described above are output to the control device 1. The control device 1 detects the operating state of the internal combustion engine 100 on the basis of the output signals from these various sensors, and controls the amount of air flowing into the cylinder 150, a fuel injection amount, and an ignition timing of the ignition plug 200.

[Hardware Configuration of Control Device]

Next, the overall hardware configuration of the control device 1 will be described.

As illustrated in FIG. 1, the control device 1 includes an analog input unit 10, a digital input unit 20, an A/D (Analog/Digital) conversion unit 30, a RAM (Random Access Memory) 40, and an MPU (Micro-Processing unit) 50, a ROM (Read Only Memory) 60, an I/O (Input/Output) port 70, and an output circuit 80.

The analog input unit 10 includes analog output signals from various types of sensors such as the throttle opening sensor 113a, the flow sensor 114, the accelerator position sensor 126, the upstream air-fuel ratio sensor 162, the downstream air-fuel ratio sensor 163, the combustion pressure sensor 140, and the water temperature sensor 122.

The A/D conversion unit 30 is connected to the analog input unit 10. The analog output signals from various sensors input to the analog input unit 10 are subjected to signal processing such as noise removal, and then converted into digital signals by the A/D conversion unit 30 and stored in the RAM 40.

The digital output signal from the crank angle sensor 121 is input to the digital input unit 20.

The I/O port 70 is connected to the digital input unit 20, and the digital output signal input to the digital input unit 20 is stored in the RAM 40 via the I/O port 70.

Each output signal stored in the RAM 40 is processed by the MPU 50.

The MPU 50 executes a control program (not illustrated) stored in the ROM 60, thereby calculating the output signal stored in the RAM 40 according to the control program. The MPU 50 calculates a control value that defines the operation amount of each actuator (for example, the throttle valve 113, the pressure regulator 132, the ignition plug 200, etc.) that drives the internal combustion engine 100 according to the control program, and temporarily stores the control value in the RAM 40.

The control value that defines the operation amount of the actuator stored in the RAM 40 is output to the output circuit 80 via the I/O port 70.

The output circuit 80 is provided with a function of an ignition control unit 83 (see FIG. 3) that controls a voltage applied to the ignition plug 200.

[Functional Block of Control Device]

Next, the functional configuration of the control device 1 will be described.

Figure 3:
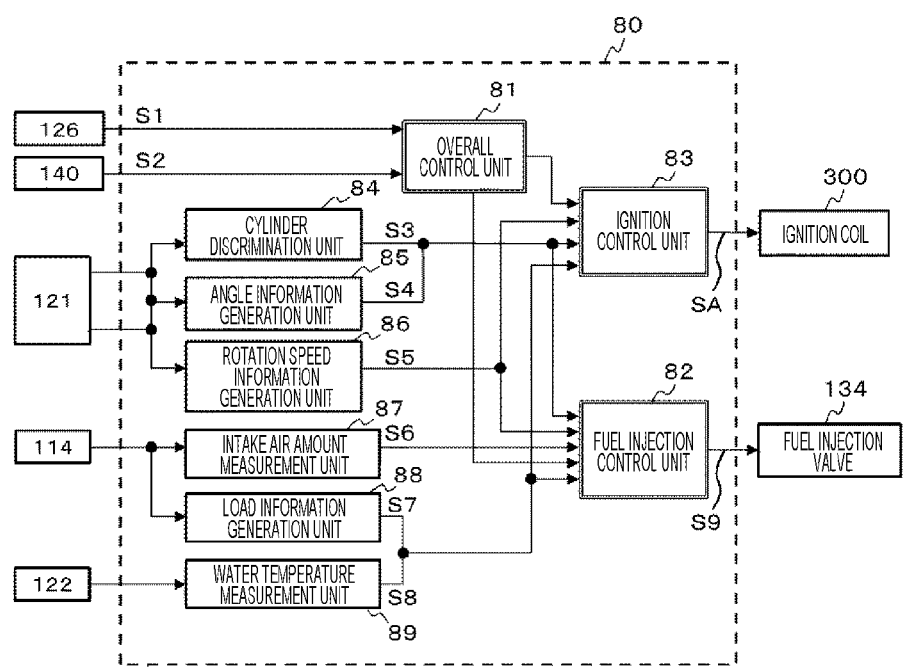
FIG. 3 is a functional block diagram illustrating a functional configuration of the control device.

FIG. 3 is a functional block diagram illustrating the functional configuration of the control device 1. Each function of the control device 1 is realized by the output circuit 80 by the MPU 50 executing the control program stored in the ROM 60.

As illustrated in FIG. 3, the output circuit 80 of the control device 1 includes an overall control unit 81, a fuel injection control unit 82, and the ignition control unit 83.

The overall control unit 81 is connected to the accelerator position sensor 126 and the combustion pressure sensor 140 (CPS), and receives a required torque (acceleration signal S1) from the accelerator position sensor 126 and the output signal S2 from the combustion pressure sensor 140.

The overall control unit 81 performs overall control of the fuel injection control unit 82 and the ignition control unit 83 on the basis of the required torque (acceleration signal S1) from the accelerator position sensor 126 and the output signal S2 from the combustion pressure sensor 140.

The fuel injection control unit 82 is connected to a cylinder discrimination unit 84 that discriminates each cylinder 150 of the internal combustion engine 100, an angle information generation unit 85 that measures the crank angle of the crankshaft 123, and a rotation speed information generation unit 86 that measures the engine speed, and receives cylinder discrimination information S3 from the cylinder discrimination unit 84, crank angle information S4 from the angle information generation unit 85, and engine rotation speed information S5 from the rotation speed information generation unit 86.

Further, the fuel injection control unit 82 is connected to an intake air amount measurement unit 87 that measures the amount of air taken into the cylinder 150, a load information generation unit 88 that measures the engine load, and a water temperature measurement unit 89 which measures the temperature of an engine coolant, and receives intake air amount information S6 from the intake air amount measurement unit 87, engine load information S7 from the load information generation unit 88, and coolant temperature information S8 from the water temperature measurement unit 89.

The fuel injection control unit 82 calculates the fuel injection amount injected from the fuel injection valve 134 and the injection time (fuel injection valve control information S9) on the basis of the received information, and controls the fuel injection valve 134 on the basis of the calculated fuel injection amount and calculated injection time.

In addition to the overall control unit 81, the ignition control unit 83 is connected to the cylinder discrimination unit 84, the angle information generation unit 85, the rotation speed information generation unit 86, the load information generation unit 88, and the water temperature measurement unit 89, and receives information therefrom.

Based on the received information, the ignition control unit 83 calculates the amount of current (energization angle) for energizing a primary coil 310 of the ignition coil 300, an energization start time, and a time (ignition time) to cut off the current for energizing the primary coil 310.

The ignition control unit 83 controls ignition by the ignition plug 200 by outputting an ignition signal SA to the primary coil 310 of the ignition coil 300 on the basis of the calculated energization amount, energization start time, and ignition time.

In addition, the ignition control unit 83 detects whether the air-fuel mixture in the cylinder 150 is ignited through ignition by the ignition plug 200 on the basis of the in-cylinder pressure and the in-cylinder volume of the cylinder 150.

The control device of the internal combustion engine of the invention corresponds to the configuration including at least the ignition plug 200 (the ignition coil 300) and the ignition control unit 83, where the ignition control unit 83 has a function of controlling ignition by the ignition plug 200 and a function of detecting ignition.

[Electric Circuit of Ignition Coil]

Next, the electric circuit 400 including the ignition coil 300 will be described.

Figure 4:
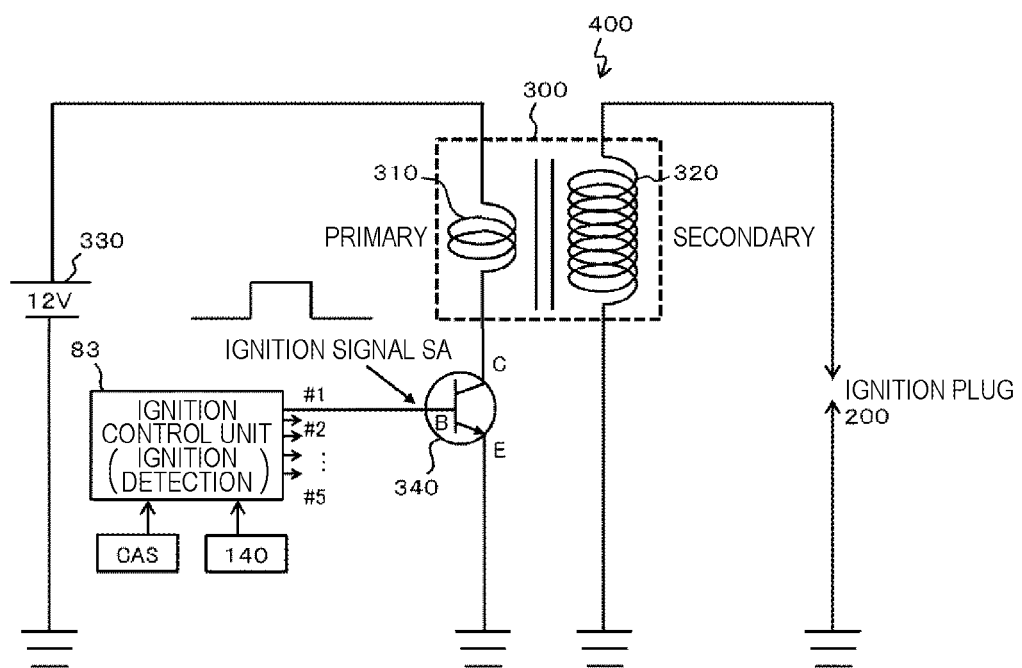
FIG. 4 is a diagram illustrating an electric circuit including an ignition coil.

FIG. 4 is a diagram for describing an electric circuit 400 including the ignition coil 300.

In the electric circuit 400, the ignition coil 300 is provided which includes the primary coil 310 wound with a predetermined number of turns and a secondary coil 320 wound with a larger number of turns than the primary coil 310.

One end of the primary coil 310 is connected to a DC power source 330. Thus, a predetermined voltage (12 V in the embodiment) is applied to the primary coil 310.

The other end of the primary coil 310 is connected to an igniter 340 and is grounded via the igniter 340. As the igniter 340, a transistor or a field effect transistor (FET) is used.

The base (B) terminal of the igniter 340 is connected to the ignition control unit 83, and the ignition signal SA output from the ignition control unit 83 is input to the base (B) terminal of the igniter 340.

When the ignition signal SA is input to the base (B) terminal of the igniter 340, the collector (C) terminal and emitter (E) terminal of the igniter 340 are energized, and the current flows between the collector (C) terminal and emitter (E) terminal. With this configuration, electric power (energy) is accumulated in the primary coil 310.

When the output of the ignition signal SA from the ignition control unit 83 is stopped and the current flowing through the primary coil 310 is interrupted, a high voltage corresponding to the coil turns ratio is generated in the secondary coil 320.

When the high voltage generated in the secondary coil 320 is applied to the ignition plug 200 (the center electrode 210), discharge is generated between the center electrode 210 and the outer electrode 220 of the ignition plug 200. When a discharge voltage generated between the center electrode 210 and the outer electrode 220 becomes equal to or higher than the breakdown voltage Vm of the gas (air-fuel mixture in the cylinder 150), the gas component undergoes dielectric breakdown and is ignited.

In the embodiment, the ignition control device 83 controls the ignition plug 200 to perform multiple times of discharge (ignition) in one combustion cycle of the internal combustion engine 100 in order to prevent an error in ignition of the mixed gas by the ignition plug 200. This multiple times of discharge (ignition) in one combustion cycle is called multiple discharge (multiple ignition).

In the ignition plug 200, when the multiple discharge is performed, the electrodes 210 and 220 are progressed in wearing as the number of times of discharge increases. In particular, when the air-fuel mixture is successfully ignited through ignition by the ignition plug 200 and discharge is performed more, the temperature around the electrode becomes higher, and the wearing of the electrode is remarkably progressed. Therefore, in order to prolong the life of the ignition plug 200, it is necessary to stop the discharge after ignition and reduce the number of times of discharge, thereby reducing the cost associated with the replacement of the ignition plug 200.

In addition, in this type of electric circuit 400, the electric path from the ignition coil 300 to the ignition plug 200 forms a large loop including a cylinder block (not illustrated) on the ground side. Therefore, large electromagnetic noise due to steep change in current of the ignition coil 300 occurs. Since this electromagnetic noise affects the control by the control device 1, it is necessary to reduce the current change of the ignition coil 300 that generates the electromagnetic noise (that is, the number of times of discharge of the ignition plug 200) as much as possible.

Further, as described above, in order to cause the ignition plug 200 to perform the multiple discharge, it is necessary to prepare an electric circuit including the ignition coil 300 and the igniter 340 as many as the number of times of discharge. For example, in a case where discharge is performed five times in one combustion cycle, it is necessary to prepare five electric circuits 400 described above. In the control device 1, it is necessary to provide as many electric circuits 400 as the number of times of discharge, so that an increase in cost becomes a big problem. Therefore, in order to reduce the cost of the control device 1, it is necessary to securely determine whether ignition has occurred and stop ignition in the case of successful ignition in order to reduce the basic number of times of discharge.

[Method for Controlling Internal Combustion Engine]

Next, the description will be given about an example of a control method for reducing the number of times of multiple discharge of the ignition plug 200, which is performed by the control device 1 of the embodiment. This control is executed by the ignition control unit 83 of the output circuit 80 in the control device 1.

Figure 5:
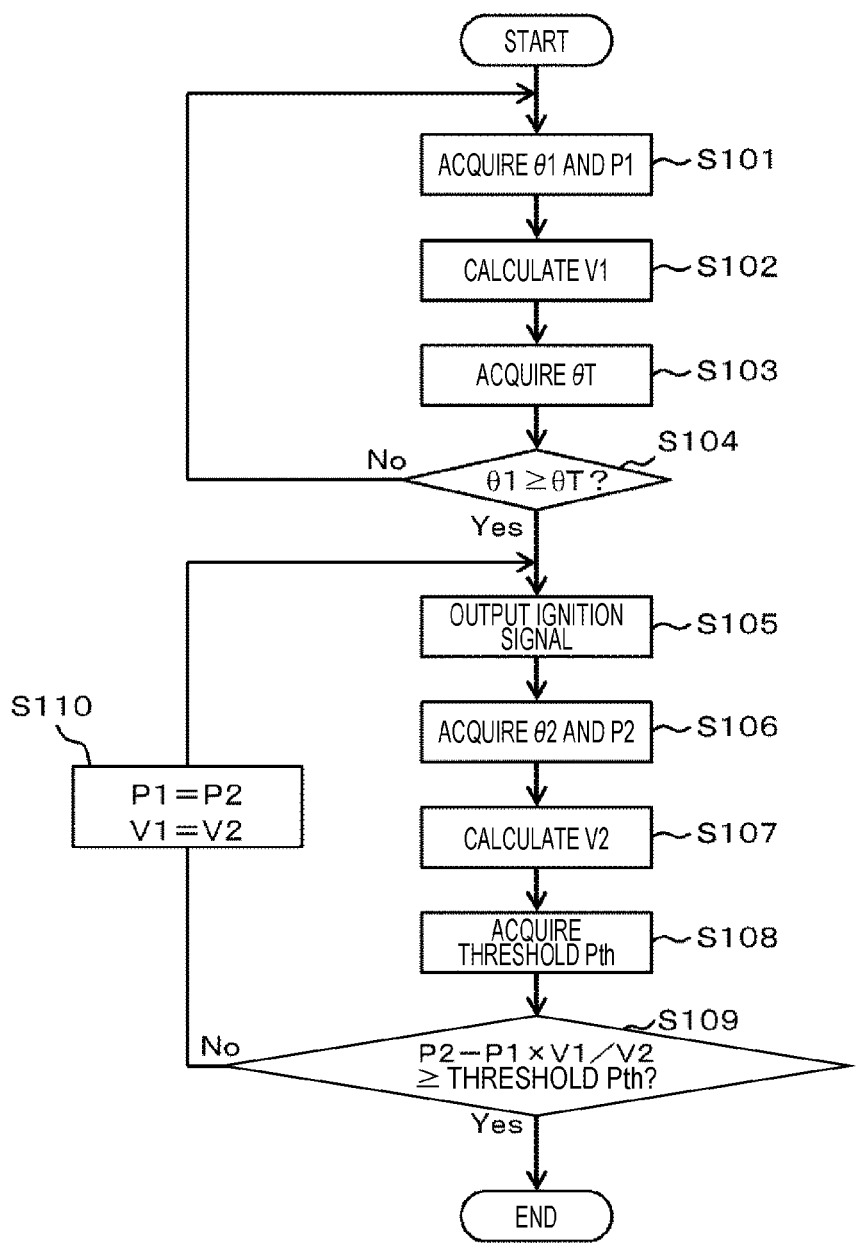
FIG. 5 is a flowchart illustrating an example of a control process of the internal combustion engine.

FIG. 5 is a flowchart illustrating an example of the control process of the internal combustion engine 100.

As illustrated in FIG. 5, in step S101, the ignition control unit 83 obtains the current crank angle θ1 (the crank angle information S4) of the crankshaft 123 detected by the crank angle sensor 121 via the angle information generation unit 85. An in-cylinder pressure P1 detected by the combustion pressure sensor 140 is acquired via the overall control unit 81.

In step S102, the ignition control unit 83 calculates a volume (in-cylinder volume) V1 of the combustion chamber of the cylinder 150 when the crank angle is θ1, on the basis of the crank angle θ1 acquired in step S101.

In step S103, the ignition control unit 83 acquires a target ignition crank angle θT.

The target ignition crank angle θT is associated with the amount of displacement of the accelerator pedal 125 (the output of the accelerator position sensor 126) and the engine speed, and is generated in a form of data table (or MAP). The ignition control unit 83 refers to this data table (or MAP) and acquires the target ignition crank angle θT on the basis of the current amount of displacement of the accelerator pedal 125 (the output of the accelerator position sensor 126) and the engine speed.

Further, a threshold Pth associated with the amount of displacement of the accelerator pedal 125 and the engine speed is stored in a form of data table, and the configuration for acquiring the threshold Pth with reference to this data table corresponds to the threshold calculation unit of the invention.

This target ignition crank angle θT is set to a crank angle that is most efficient for the operation of the internal combustion engine 100 (high output torque or good combustion stability) on the basis of the operating state (a gas flow and rotation speed) of the internal combustion engine 100.

In step S104, the ignition control unit 83 compares the crank angle θ1 acquired in step S101 with the target ignition crank angle θT, and determines whether the crank angle θ1 is equal to or greater than the target ignition crank angle θT (θ1≥θT).

In a case where it is determined that the crank angle θ1 is equal to or greater than the target ignition crank angle θT (step S104: Yes), the ignition control unit 83 proceeds to step S105 and outputs the ignition signal SA to the ignition coil 300. On the other hand, in a case where the ignition control unit 83 determines that the crank angle θ1 is less than the target ignition crank angle θT (step S104: No), the ignition control unit 83 returns to step S101 and acquires the current crank angle θ1 again. The processes in steps S101 to S104 are repeated until the acquired crank angle θ1 becomes equal to or greater than the target ignition crank angle θT.

In step S106, the ignition control unit 83 acquires the crank angle θ2 after the ignition plug 200 discharges (ignites) from the crank angle sensor 121, and also acquires an in-cylinder pressure P2 after the ignition plug 200 discharges (ignites) from the combustion pressure sensor 140.

In step S107, the ignition control unit 83 calculates a volume (in-cylinder volume) V2 of the combustion chamber of the cylinder 150 when the crank angle is θ2, on the basis of the crank angle θ2 acquired in step S106.

In step S108, the ignition control unit 83 acquires a predetermined threshold Pth associated with the amount of displacement of the accelerator pedal 125 and the engine speed.

In step S109, the ignition control unit 83 compares the difference H (H=P2−P1×(V1/V2)) between the in-cylinder pressure P2 after ignition detected by the combustion pressure sensor 140 and the in-cylinder pressure (P1×(V1/V2)) calculated on the basis of a state equation with the threshold Pth acquired in step S108, and determines whether the difference H (H=P2−P1×(V1/V2)) between the in-cylinder pressure P2 after ignition and the in-cylinder pressure (P1×(V1/V2)) calculated on the basis of the state equation is equal to or greater than the threshold Pth. In a case where the difference H is equal to or greater than the threshold Pth (step S109: Yes), the discharge (ignition) process of the ignition plug 200 ends.

In a case where the difference H (P2−P1×(V1/V2)) between the in-cylinder pressure P2 after ignition and the in-cylinder pressure (P1×(V1/V2)) calculated on the basis of the state equation is less than the threshold Pth (step S109:

No), the ignition control unit 83 updates the parameters P1 and V1 to the most recently acquired values P2 and V2 (step S110).

Thereafter, the ignition control unit 83 returns to step S105 to perform discharge (ignition) of the ignition plug 200, and repeats the processes of steps S105 to S110 until the difference H (P2−P1×(V1/V2)) between the in-cylinder pressure P2 after ignition and the in-cylinder pressure (P1×(V1/V2)) calculated on the basis of the state equation of the in-cylinder pressure P2 after ignition becomes equal to or greater than the threshold Pth.

Next, an example of control of the internal combustion engine 100 by the control device 1 according to the embodiment will be described along the flowchart described above with reference to FIG. 6.

Figure 6:
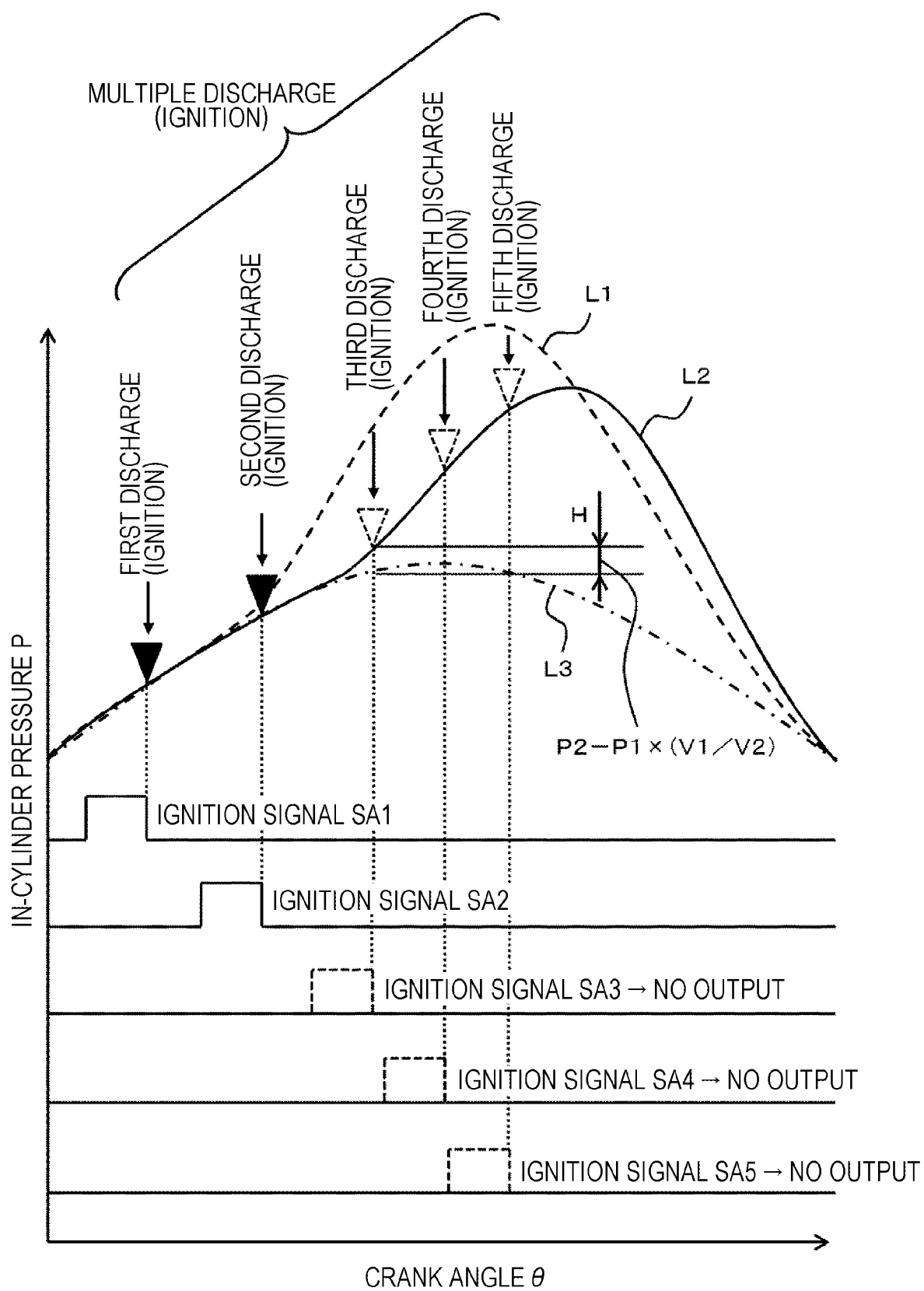
FIG. 6 is a schematic diagram for describing an example of control by the internal combustion engine.

FIG. 6 is a diagram for describing an example of the control of the internal combustion engine 100 by the control device 1 according to the embodiment. In FIG. 6, the horizontal axis represents the crank angle θ, and the vertical axis represents the in-cylinder pressure P.

In FIG. 6, a pressure curve L1 (dotted line) represents an example of the in-cylinder pressure of the cylinder 150 in a case where ignition occurs in the first discharge (ignition), and a pressure curve L2 (solid line) represents an example of the in-cylinder pressure of the cylinder 150 in a case where ignition occurs in the second discharge (ignition), and a pressure curve L3 (dashed line) represents an example of the in-cylinder pressure of the cylinder 150 in the case of the state equation (adiabatic change). The pressure curve L3 based on the state equation indicates the in-cylinder pressure when no ignition occurs.

In addition, in FIG. 6, ignition signals SA1 to SA5 output from the ignition control unit 83 are illustrated below the pressure curves L1 to L3.

As illustrated in FIG. 6, first, the pressure curve L1 will be described. The ignition control unit 83 acquires the current crank angle θ1 and the in-cylinder pressure P1 (step 101 in FIG. 5), and calculates the in-cylinder volume V1 on the basis of the crank angle 1 (step S102 in FIG. 5).

The ignition control unit 83 refers to a data table (or MAP) associated with the amount of displacement (depression amount) of the accelerator pedal 125 and the engine speed, and acquires the target ignition crank angle θT (step S103 in FIG. 5), and determines whether the crank angle 1 is equal to or greater than the target ignition crank angle θT (step S104 in FIG. 5).

In the embodiment illustrated in FIG. 6, the ignition control unit 83 determines that the crank angle 1 is equal to or larger than the target ignition crank angle θT at a predetermined timing (step S104 in FIG. 5: Yes), and the first ignition signal SA1 is output (step S105 in FIG. 5).

The ignition control unit 83 acquires the crank angle θ2 and the in-cylinder pressure P2 after ignition (step S106 in FIG. 5), and calculates the in-cylinder volume V2 on the basis of the crank angle θ2 (step S107 in FIG. 5).

Then, the ignition control unit 83 acquires a predetermined threshold Pth associated with the amount of displacement (depression amount) of the accelerator pedal 125 and the engine speed (step S108 in FIG. 5), and determines whether the difference H (P2−P1×(V1/V2)) between the in-cylinder pressure P2 after ignition and the in-cylinder pressure (P1×(V1/V2)) of the cylinder 150 calculated on the basis of the state equation is equal to or greater than the threshold Pth (step S109 of FIG. 5).

The pressure curve L1 of the embodiment represents a case where the air-fuel mixture in the cylinder 150 is ignited by the first discharge (ignition) of the ignition plug 200. In this case, since an explosion occurs in the cylinder 150, the in-cylinder pressure P2 after being ignited by the first discharge (ignition) is rapidly increased compared to the in-cylinder pressure on the basis of the state equation. Therefore, the difference H (P2−P1×(V1/V2)) between the in-cylinder pressure P2 after the first discharge (ignition) and the in-cylinder pressure calculated based on the state equation is equal to or greater than the threshold Pth (step S109 in FIG. 5: Yes), the ignition control unit 83 stops the second discharge of the ignition plug 200 (stops the output of the ignition signal SA2), and ends the process.

As illustrated in FIG. 6, in the pressure curve L1, the piston 170 is pushed down due to the explosion in the cylinder 150 and combustion gas expands, so that the in-cylinder pressure rapidly decreases.

Next, in the pressure curve L2, the air-fuel mixture in the cylinder 150 is not ignited by the first discharge (ignition). Therefore, the in-cylinder pressure P2 after ignition becomes a value that approximates the in-cylinder pressure calculated on the basis of the state equation. Therefore, in this case, the difference H (P2−P1×(V1/V2)) between the in-cylinder pressure P2 after ignition and the in-cylinder pressure calculated on the basis of the state equation is less than the threshold Pth (step S109 in FIG. 5: No). After that, the ignition control unit 83 replaces the in-cylinder pressure P1 and the in-cylinder volume V1 with the most recently acquired in-cylinder pressure P2 and in-cylinder volume V2 (step S110 in FIG. 5), and then outputs the second ignition signal SA2 (step S105 in FIG. 5).

The ignition control unit 83 acquires the crank angle θ2 and the in-cylinder pressure P2 after the second discharge (ignition) (step S106 in FIG. 5), and calculates the in-cylinder volume V2 on the basis of the crank angle θ2 (step S107 in FIG. 5).

Then, the ignition control unit 83 acquires a threshold Pth associated with the amount of displacement (depression amount) of the accelerator pedal 125 after the second discharge (ignition) and the engine speed (step S108 in FIG. 5), and determines whether the difference H (P2−P1×(V1/V2)) between the in-cylinder pressure P2 after ignition and the in-cylinder pressure calculated on the basis of the state equation is equal to or greater than the threshold Pth (step S109 of FIG. 5).

The pressure curve L2 of the embodiment represents a case where the air-fuel mixture in the cylinder 150 is ignited by the second discharge (ignition) of the ignition plug 200. In this case, since an explosion occurs in the cylinder 150, the in-cylinder pressure P2 after ignition by the second discharge (ignition) is rapidly increased compared to the in-cylinder pressure (P1×(V1/V2)) calculated based on the state equation. Therefore, the difference H (P2−P1×(V1/V2)) between the in-cylinder pressure P2 after the second discharge (ignition) and the in-cylinder pressure calculated based on the state equation is equal to or greater than the threshold Pth (step S109 of FIG. 5: Yes), the ignition control unit 83 stops the third discharge of the ignition plug 200 (stops the output of the ignition signal SA3), and ends the process.

As described above, the ignition control unit 83 of the control device 1 does not output an ignition signal for the first ignition or the second ignition or later (second to fifth or third to fifth ignitions), so that the discharge (ignition) of the first ignition or the second ignition or later (second to fifth or third to fifth ignitions) is not performed in the ignition plug 200.

As a result, the number of times of multiple discharge (ignition) by the ignition plug 200 can be reduced, and wearing of the electrodes 210 and 220 can be suppressed.

In particular, in the discharge (ignition) after ignition of the air-fuel mixture, the in-cylinder pressure increases and the breakdown voltage also increases. Therefore, in order to further ignite the air-fuel mixture, a large voltage is necessarily applied between the electrodes 210 and 220 of the ignition plug 200 to discharge, and this discharge promotes wearing of the electrodes 210 and 220. In the control device 1 according to the embodiment, since the discharge (ignition) of the ignition plug 200 after ignition is stopped, wearing of the electrodes 210 and 220 of the ignition plug 200 can be suppressed.

As described above, in the embodiment, (1) there is provided the ignition plug 200 (ignition device) provided in the cylinder 150 of the internal combustion engine 100, and the ignition control device 83 that includes the ignition control unit that controls discharge (ignition) of the ignition plug 200 (an ignition control function exhibited by the process of steps S101 to S105 in the ignition control unit 83), and an ignition detection unit that detects ignition of the air-fuel mixture due to ignition by the ignition plug 200 (ignition detection function exhibited by the process of step S109 in the ignition control unit 83). The ignition control device 83 is configured to stop ignition by the ignition plug 200 on the basis of detection of ignition of the air-fuel mixture through ignition by the ignition plug 200.

With this configuration, the ignition control unit 83 stops the ignition by the ignition plug 200 after detecting the ignition of the air-fuel mixture due to the ignition by the ignition plug 200, so that the excess ignition after the ignition is not performed. Therefore, the control device 1 can reduce the number of times of discharge while preventing an error in ignition of the air-fuel mixture by the ignition plug 200. As a result, wearing of the ignition plug 200 can be suppressed.

(2) In addition, the ignition control unit 83 is configured to control the ignition plug 200 so as to perform ignition a plurality of times (in the embodiment, five times) in one combustion cycle of the internal combustion engine 100.

With this configuration, it is possible to prevent an error in ignition of the air-fuel mixture through the multiple discharge by the ignition plug 200.

(3) In addition, after ignition by the ignition plug 200, the ignition control unit 83 stops the ignition by the ignition plug 200 on the basis of detection of the ignition of the air-fuel mixture by the ignition control unit 83 in one combustion cycle.

With this configuration, the ignition control unit 83 stops the ignition by the ignition plug 200 on the basis of detection of the ignition of the air-fuel mixture by the ignition plug 200, so that the excess ignition by the ignition plug 200 after successful ignition can be prevented.

(4) In addition, the control device 1 includes the combustion pressure sensor 140 (in-cylinder pressure detection device) that detects the pressure in the cylinder 150. The ignition control unit 83 detects the ignition of the air-fuel mixture due to ignition by the ignition plug 200 on the basis of the in-cylinder pressure P1 before ignition and the in-cylinder pressure P2 after ignition in the cylinder 150 detected by the combustion pressure sensor 140.

With this configuration, the ignition control unit 83 can accurately determine whether the air-fuel mixture is ignited by the ignition by the ignition plug 200 on the basis of the combustion state in the cylinder 150 (the in-cylinder pressure P1 before ignition and the in-cylinder pressure P2 after ignition).

(5) In addition, the ignition control unit 83 detects the ignition of the air-fuel mixture by the ignition by the ignition plug 200 on the basis of a result obtained by comparing the in-cylinder pressure P1 before ignition and the in-cylinder pressure P2 after ignition detected by the combustion pressure sensor 140 with the threshold Pth (first threshold) associated with the amount of displacement of the accelerator pedal 125 and the engine speed. The ignition control unit 83 includes the data table (threshold calculation unit) to calculate the threshold Pth. The data table is used to calculate the engine speed (the in-cylinder pressure P1) before the ignition plug 200 starts ignition and the amount of displacement (the in-cylinder volume V1) of the accelerator pedal 125.

With this configuration, the ignition control unit 83 can easily acquire the threshold for determining the presence or absence of ignition from the in-cylinder pressure P1 and the in-cylinder volume V1 of the cylinder 150.

(6) In addition, the ignition control unit 83 detects the ignition by the ignition plug 200 on the basis of the in-cylinder pressure P2 after ignition by the ignition plug 200 and the in-cylinder pressure (P1×(V1/V2)) calculated on the basis of the state equation.

With this configuration, the ignition control unit 83 compares the in-cylinder pressure (P1×(V1/V2)) calculated using the state equation representing a state where ignition is not performed with the in-cylinder pressure P2 after ignition to determine whether there is ignition. Therefore, in a case where the ignition is performed, the difference between the in-cylinder pressure P2 after ignition and the in-cylinder pressure (P1×(V1/V2)) calculated from the state equation becomes large. Therefore, the ignition control unit 83 can accurately determine the presence or absence of ignition by comparing the in-cylinder pressure P2 after ignition with the in-cylinder pressure (P1×(V1/V2)) calculated from the state equation.

(7) In addition, the ignition control unit 83 determines that the ignition of the air-fuel mixture through ignition by the ignition plug 200 is completed in a case where the in-cylinder pressure P2 after ignition by the ignition plug 200 is equal to or higher than the threshold Pth.

With this configuration, it is possible to determine whether the air-fuel mixture is ignited through ignition by the ignition plug 200 on the basis of the in-cylinder pressure P2 after ignition by the ignition plug 200 by appropriately setting the threshold Pth. Therefore, the presence or absence of ignition can be determined only by a signal from the combustion pressure sensor 140 mounted on a general vehicle. There is no need to separately provide a sensor for determining the presence or absence of ignition, so that the manufacturing cost and the complexity of the control device 1 can be suppressed.

(8) In addition, there are provided an ignition step of igniting by the ignition plug 200 provided in the cylinder 150 of the internal combustion engine 100 (step S105), an ignition detection step of detecting ignition of the air-fuel mixture in the cylinder 150 through ignition by the ignition plug 200 (step S109), and an ignition stopping step of stopping ignition by the ignition plug 200 on the basis of detection of ignition of the air-fuel mixture in the ignition detection step (step S109: end of processing based on determination of Yes).

With this configuration, in a case where the ignition by the ignition plug 200 is detected, the ignition by the next ignition plug 200 is stopped, so that the number of times of discharge of the ignition plug 200 in multiple discharge can be reduced, and the life of the ignition plug 200 can be extended.

(9) In addition, there are provided an in-cylinder pressure measurement step (steps S101 and S106) of measuring the in-cylinder pressures P1 and P2 of the cylinder 150, and an in-cylinder volume measurement step (steps S102 and S107) of measuring the in-cylinder volumes V1 and V2 of the cylinder 150. In an ignition detection step (step S109), the ignition of the air-fuel mixture through ignition by the ignition plug 200 is detected on the basis of the in-cylinder pressures P1 and P2 (the pressures in the cylinder) measured in the in-cylinder pressure measurement step (steps S101 and S106) and the volumes V1 and V2 in the cylinder 150 measured in the in-cylinder volume measurement step (steps S102 and S107).

With this configuration, it is possible to appropriately detect whether the air-fuel mixture is ignited through ignition by the ignition plug 200 on the basis of the in-cylinder pressures P1 and P2 before and after ignition and the volumes V1 and V2.

Second Embodiment

Next, a control device 1A of the internal combustion engine 100 according to the second embodiment will be described. The control device 1A according to the second embodiment differs from the above-described embodiment in that discharge (ignition) is performed by the ignition plug 200 in consideration of the discharge (ignition) interval of the ignition plug 200.

Figure 7:
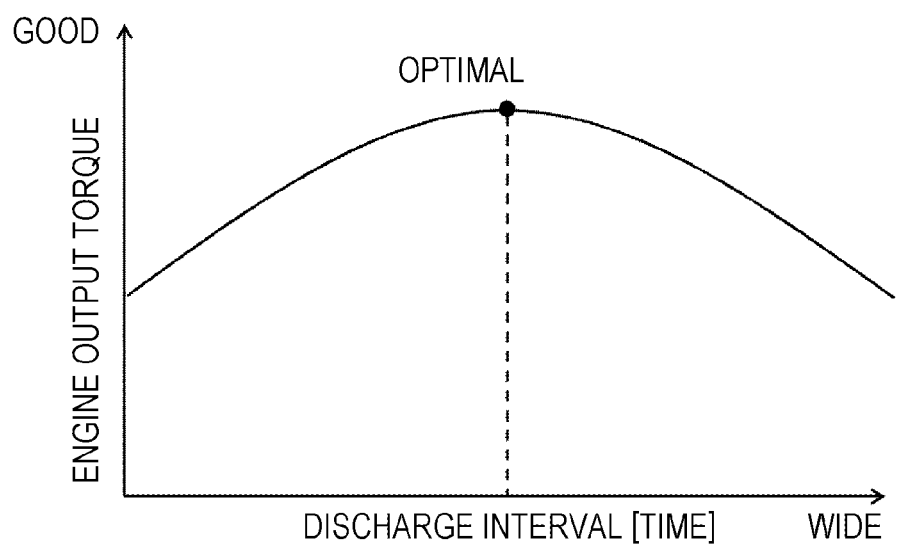
FIG. 7 is a diagram for describing a relation between a discharge interval of the ignition plug and an output torque of the engine.

FIG. 7 is a diagram for describing the relation between the discharge interval of the ignition plug 200 and the output torque of the engine.

Figure 8:
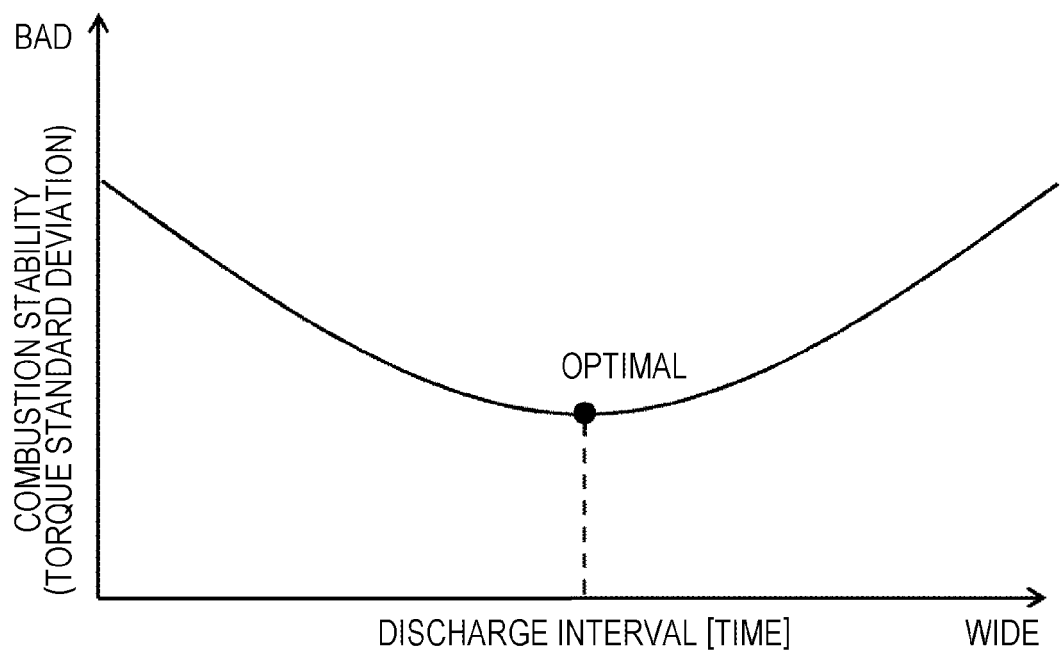
FIG. 8 is a diagram for describing the relation between the discharge interval of the ignition plug and combustion stability.

FIG. 8 is a diagram for describing the relation between the discharge interval of the ignition plug 200 and the combustion stability (the standard deviation of torque).

Figure 9:
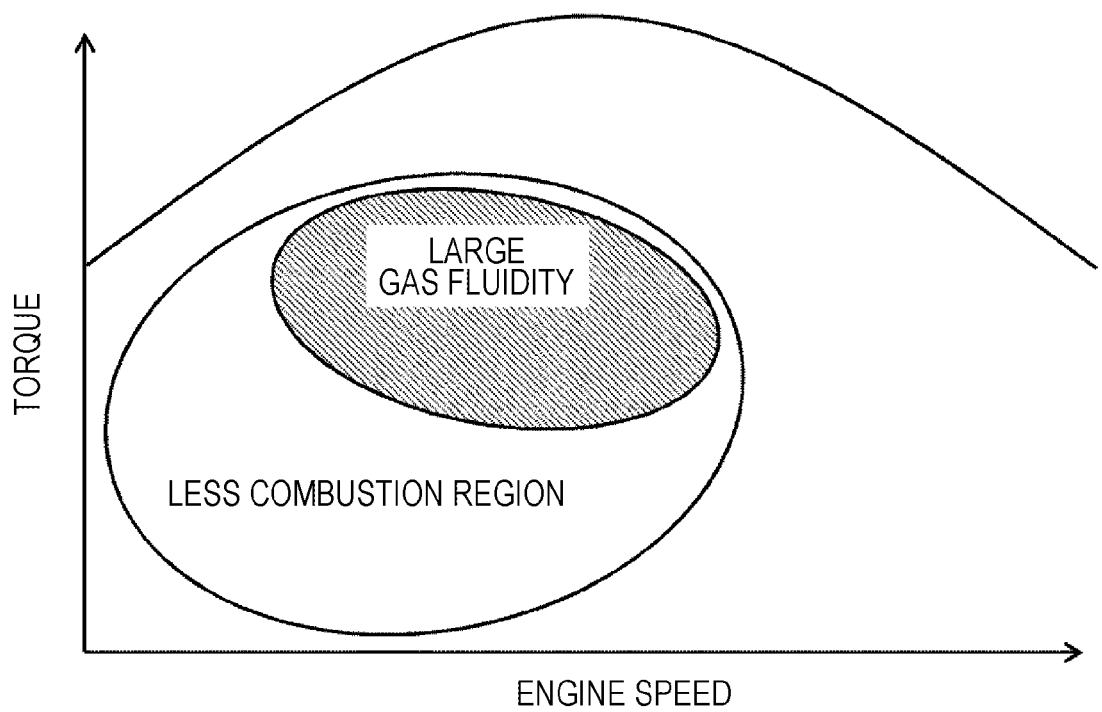
FIG. 9 is a diagram for describing the fluidity of combustion gas in the relation between engine speed and torque.

FIG. 9 is a diagram for describing the fluidity of combustion gas in the relation between the engine speed and the torque.

In the cylinder 150 of the internal combustion engine 100, it is difficult to ignite the gas (air-fuel mixture) even if the discharge (ignition) is performed again unless the composition of the gas after the discharge (ignition) by the ignition plug 200 is improved. Therefore, it is necessary to set the discharge (ignition) interval on the basis of the state of gas flow in the cylinder 150. For example, it is desirable to narrow the discharge interval in a case where the gas flow in the cylinder 150 is fast, and widen the discharge interval in a case where the gas flow is slow.

As illustrated in FIG. 7, the discharge interval of the ignition plug 200 has an optimal interval depending on the gas flow in the cylinder 150. By setting this optimal discharge interval, an output torque of the engine is maximized to increase efficiency. Further, even if the discharge interval of the ignition plug 200 is simply widened, the output torque of the engine is lowered and the efficiency of the engine is deteriorated.

In addition, as illustrated in FIG. 8, the same can be said by looking at the relation between the discharge interval of the ignition plug 200 and the combustion stability.

As illustrated in FIG. 8, by setting the discharge interval of the ignition plug 200 to an optimal interval, the combustion stability can be improved. Here, the standard deviation of the output torque of the engine is illustrated as an index of the combustion stability. When the standard deviation of the output torque of the engine is high, a rotational fluctuation of the crankshaft 123 becomes large and the output torque of the engine becomes unstable.

By appropriately setting the discharge interval of the ignition plug 200 on the basis of the state of gas flow in the cylinder 150, ignition delay and misfire are prevented, and the combustion stability is improved. As a result, for example, the internal combustion engine 100 can perform combustion in a state where the fuel is leaner (the air-fuel ratio is large).

As illustrated in FIG. 9, the gas flow in the cylinder 150 also varies depending on the engine speed. Therefore, the ignition control unit 83 needs to set the discharge interval of the ignition plug 200 on the basis of the gas flow corresponding to the engine speed. As illustrated in FIG. 9, it can be seen that there is a region where the gas fluidity is large and a region where the gas fluidity is less, especially in the internal combustion engine in a case where the control is performed to make the fuel lean and burn. Therefore, an optimal discharge interval can be set for each operation condition by detecting the gas fluidity for each operation condition in advance.

[Method for Controlling Internal Combustion Engine]

Next, the description will be given about an example of the control process of the internal combustion engine 100 in a case where the discharge interval of the ignition plug 200 is set optimally.

Figure 10:
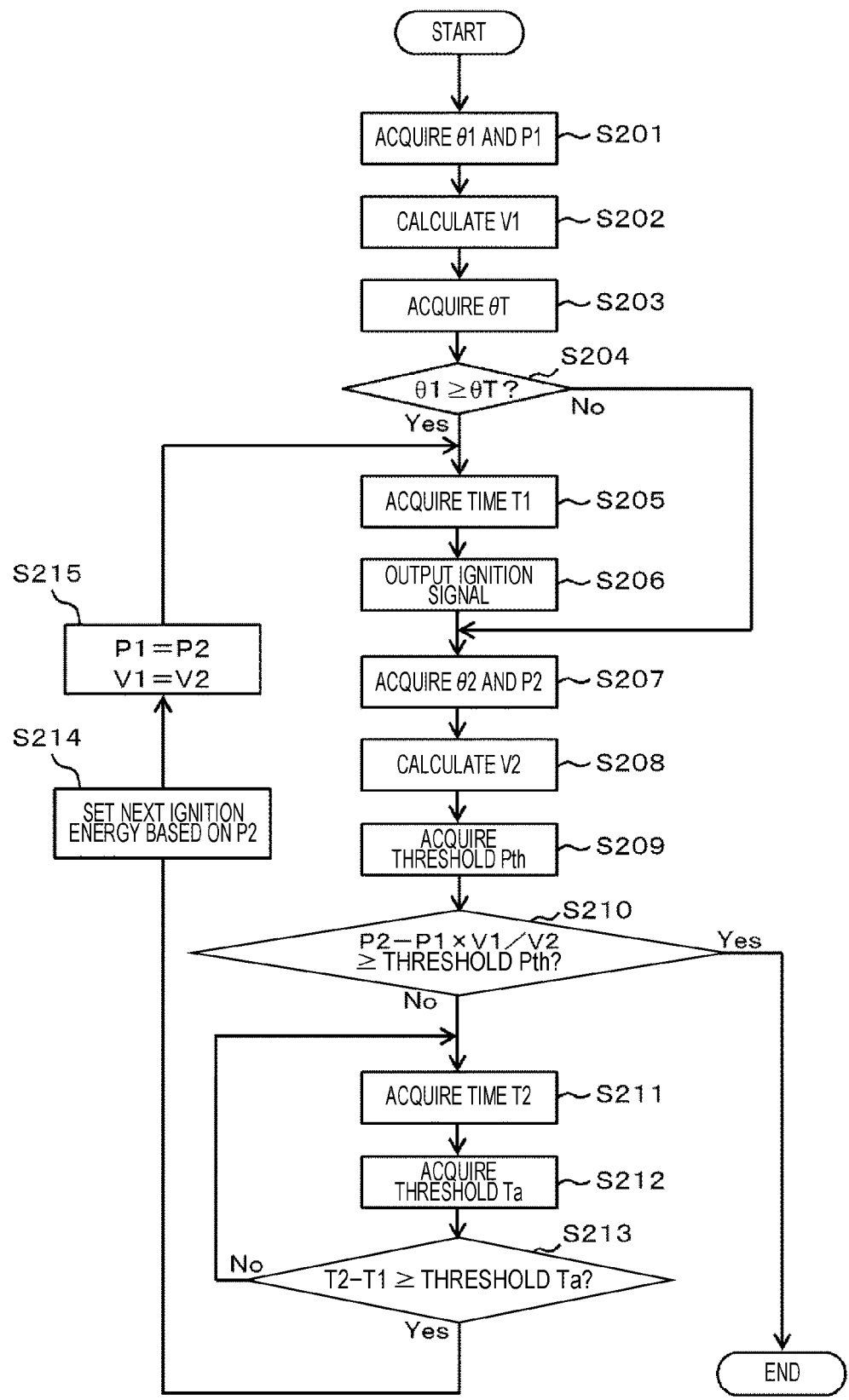
FIG. 10 is a flowchart illustrating an example of a control process of the internal combustion engine according to the second embodiment.

FIG. 10 is a flowchart illustrating an example of the control process of the internal combustion engine 100 according to the second embodiment.

As illustrated in FIG. 10, in steps S201 to S204, the ignition control unit 83 performs the same procedures as steps S101 to S104 of the control method of the above-described embodiment.

Specifically, the ignition control unit 83 acquires the crank angle θ1 and the in-cylinder pressure P1 at the current time point (step S201), and calculates the in-cylinder volume V1 on the basis of the crank angle θ1 (step S202).

The ignition control unit 83 refers to the same data table as described above, acquires the target ignition crank angle θT, and compares the target ignition crank angle θT with the current crank angle θ1.

In a case where it is determined that the current crank angle θ1 is equal to or greater than the target ignition crank angle θT (step S204: Yes), the ignition control unit 83 acquires the time T1 before ignition (step S205) and outputs the ignition signal SA to the ignition coil 300 (step S206).

The ignition control unit 83 acquires the crank angle θ2 and the in-cylinder pressure P2 after discharge (ignition) of the ignition plug 200 (step S207), and calculates the in-cylinder volume V2 on the basis of the crank angle θ2 (step S208).

The ignition control unit 83 refers to the same data table (or MAP) described in step S108, acquires a predetermined threshold Pth (step S209), and determines whether the difference H (P2−P1×(V1/V2)) between the in-cylinder pressure P2 after discharge (ignition) by the ignition plug 200 and the in-cylinder pressure calculated on the basis of the state equation is equal to or greater than the threshold Pth (step S210).

In a case where it is determined that the difference H (P2−P1×(V1/V2)) between the in-cylinder pressure P2 after discharge (ignition) by the ignition plug 200 and the in-cylinder pressure calculated on the basis of the state equation is equal to or greater than the threshold Pth (step S210: Yes), the ignition control unit 83 determines that the ignition of the air-fuel mixture through ignition by the ignition plug 200 is successful, and ends the process without performing the ignition by the next ignition plug 200.

On the other hand, in a case where it is determined that the difference H (P2−P1×(V1/V2)) between the in-cylinder pressure P2 after discharge (ignition) by the ignition plug 200 and the in-cylinder pressure calculated on the basis of the state equation is less than the threshold Pth (step S210: No), the ignition control unit 83 acquires the time T2 after ignition (step S211).

Herein, the ignition control unit 83 has a data table (or MAP) in which a target ignition interval Ta by the ignition plug 200, the amount of displacement of a clutch pedal 125, and the engine speed are associated. The ignition control unit 83 refers to the data table (or MAP) from the current amount of displacement of the clutch pedal 125 and the engine speed of the current time, and acquires the target ignition interval Ta (step S212).

The ignition control unit 83 determines whether the difference (T2−T1) between the time T2 after ignition acquired in step S211 and the time T1 before ignition acquired in step S205 is equal to or greater than the target ignition interval Ta (step S213).

In a case where it is determined that the ignition interval (T2−T1) of the ignition plug 200 is equal to or greater than the target ignition interval Ta (step S213: Yes), the ignition control unit 83 sets ignition energy required at the next ignition timing on the basis of the in-cylinder pressure P2 after ignition (step S214). Further, in a case where it is determined that the ignition interval (T2−T1) of the ignition plug 200 is less than the target ignition interval Ta (step S213: No), the ignition control unit 83 returns to step S211 and repeats the processes of steps S211 and S213 until the ignition interval becomes the target ignition interval Ta.

Herein, in the cylinder 150, the breakdown voltage for igniting the air-fuel mixture (gas) changes according to the in-cylinder pressure, and the breakdown voltage increases as the in-cylinder pressure increases. Therefore, the ignition control unit 83 calculates and sets the energy required for the next ignition on the basis of the in-cylinder pressure P2 after ignition. As a result, the ignition control unit 83 controls the voltage to be applied to the next ignition plug 200.

Then, the ignition control unit 83 replaces the in-cylinder pressure P1 and the in-cylinder volume V1 with the most recently acquired in-cylinder pressure P2 and in-cylinder volume V2 (step S215), returns to step S205, and acquires the time T1 before the next ignition (step S205) and outputs the next ignition signal SA (step S206).

As described above, in a case where it is determined that the ignition has not occurred (step S210: No), the ignition control unit 83 sets the ignition interval (T2−T1) for the second and subsequent ignitions to an optimal ignition interval Ta, and then the second and subsequent ignitions are performed. Therefore, the ignition control unit 83 can output the ignition signal SA at the ignition interval that optimizes the engine efficiency. Further, in the first ignition, since an optimal ignition interval that is set in advance is known, the ignition signal SA is output at the ignition interval.

As explained above, in the second embodiment,

(10) the ignition control unit 83 is configured to adjust the ignition interval of the ignition plug 200 in one combustion cycle.

(11) Further, there are provided an ignition time measurement step (steps S205 and S211) for measuring an ignition continuation time (T2−T1) of the ignition plug 200, an ignition continuation time determination step (step S213) for determining whether the ignition continuation time (T2−T1) measured in the ignition time measurement step (steps S205 and S211) is equal to or greater than the threshold Ta (second threshold), and an ignition holding step (returning to step S211 when No in step S213, and repeating steps S211 and S213 until satisfying T2−T1≥Ta) for not igniting by the ignition plug 200 until the ignition continuation time (Time T2−Time T1) reaches or exceeds the threshold Ta in a case where it is determined that the ignition continuation time (Time T2−Time T1) is less than the threshold Ta in the ignition continuation time determination step (step S213).

With this configuration, the ignition interval of the ignition plug 200 can be adjusted according to the gas flow state in the cylinder 150, thereby obtaining an ignition interval that optimizes the output torque of the engine and the combustion stability. Therefore, the efficiency of the internal combustion engine can be improved.

Hitherto, while the embodiments of the invention have been described as an example, the invention may be realized by combining all the embodiments, or by appropriately combining any two or more embodiments.

In addition, the invention is not limited to the one having all the configurations of the above-described embodiments. A part of the configuration of the above-described embodiment may be replaced with the configuration of another embodiment. In addition, the configuration of the above-described embodiment may be replaced with the configuration of another embodiment.

In addition, a part of the configuration of the above-described embodiment may be added to, deleted from, or replaced with the configuration of another embodiment.

REFERENCE SIGNS LIST 1 control device
10 analog input unit
20 digital input unit
30 A/D conversion unit
40 RAM
50 MPU
60 ROM
70 I/O port
80 output circuit
81 overall control unit
82 fuel injection control unit
83 ignition control unit
84 cylinder discrimination unit
85 angle information generation unit
86 rotation Speed information generation unit
87 intake air amount measurement unit
88 load information generation unit
89 water temperature measurement unit
100 internal combustion engine
110 air cleaner
111 old period
112 intake manifold
113 throttle valve
113a throttle opening sensor
114 flow sensor
115 intake air temperature sensor
120 ring gear
121 crank angle sensor
122 water temperature sensor
123 crankshaft
125 accelerator pedal
126 accelerator position sensor
130 fuel tank
131 fuel pump
132 pressure regulator 133 fuel pipe
134 fuel injection valve
140 combustion pressure sensor
150 cylinder
160 exhaust manifold
161 three-way catalyst
162 upstream air-fuel ratio sensor
163 downstream air-fuel ratio sensor
170 piston
200 ignition plug
210 center electrode
220 outer electrode
230 insulator
300 ignition coil
310 primary coil
320 secondary coil
330 DC power source
340 igniter
400 electric circuit

The invention claimed is:

1. A control device of an internal combustion engine, comprising:
an ignition device which is provided in a cylinder of the internal combustion engine;
an ignition control device which includes an ignition control unit to control ignition by the ignition device, and an ignition detection unit to detect ignition of an air-fuel mixture through ignition by the ignition device; and
an in-cylinder pressure detection device which detects a pressure in the cylinder,
wherein the ignition control device stops ignition by the ignition device on the basis of detection of the ignition of the air-fuel mixture through ignition by the ignition device,
wherein the ignition control device controls the ignition device to perform ignition a plurality of times in one combustion cycle of the internal combustion engine,
wherein after ignition by the ignition device, the ignition control device stops ignition by the ignition device on the basis of detection of ignition of the air-fuel mixture by the ignition detection unit in the one combustion cycle, and
wherein the ignition control device detects ignition of the air-fuel mixture through ignition by the ignition device on the basis of pressures before and after ignition in the cylinder detected by the in-cylinder pressure detection device.

2. The control device of the internal combustion engine according to claim 1, wherein
the ignition control device detects ignition of the air-fuel mixture through ignition by the ignition device on the basis of a result of comparison between the pressure in the cylinder detected by the in-cylinder pressure detection device and a first threshold, and includes a threshold calculation unit which calculates the first threshold, and
the threshold calculation unit calculates the first threshold on the basis of a pressure in the cylinder and a volume in the cylinder before the ignition device starts ignition.

3. The control device of the internal combustion engine according to claim 1, wherein the ignition control device detects ignition through ignition by the ignition device on the basis of a pressure in the cylinder after ignition by the ignition device and an in-cylinder pressure calculated by a state equation.

4. The control device of the internal combustion engine according to claim 3, wherein, in a case where the pressure in the cylinder is equal to or greater than the first threshold, the ignition control device determines that the ignition of the air-fuel mixture through ignition by the ignition device is completed.

5. The control device of the internal combustion engine according to claim 1, wherein the ignition control device adjusts an ignition interval of the ignition device in the one combustion cycle.

6. A method for controlling an internal combustion engine, comprising:
an ignition step of igniting by an ignition device provided in a cylinder of the internal combustion engine;
an ignition detection step of detecting ignition of an air-fuel mixture in the cylinder through ignition by the ignition device;
an ignition stopping step of stopping ignition by the ignition device on the basis of detection of ignition of the air-fuel mixture in the ignition detection step;
an in-cylinder pressure measuring step of measuring a pressure in the cylinder; and
an in-cylinder volume measurement step of measuring a volume in the cylinder,
wherein, in the ignition step, ignition is performed a plurality of times in one combustion cycle of the internal combustion engine, and
wherein, in the ignition detection step, the ignition of the air-fuel mixture through ignition by the ignition device is detected on the basis of a pressure in the cylinder measured in the in-cylinder pressure measuring step and a volume in the cylinder measured in the in-cylinder volume measurement step.

7. The method for controlling an internal combustion engine according to claim 6, further comprising:
an ignition time measurement step of measuring an ignition continuation time of the ignition device;
an ignition continuation time determination step of determining whether the ignition continuation time measured in the ignition time measurement step is equal to or greater than a second threshold; and
an ignition holding step of performing no ignition by the ignition device until the ignition continuation time becomes equal to or greater than the second threshold in a case where it is determined that the ignition continuation time is less than the second threshold in the ignition continuation time determination step.

8. A control device of an internal combustion engine, comprising:
an ignition device which is provided in a cylinder of the internal combustion engine; and
an ignition control device which includes an ignition control unit to control ignition by the ignition device, and an ignition detection unit to detect ignition of an air-fuel mixture through ignition by the ignition device,
wherein the ignition control device stops ignition by the ignition device on the basis of detection of the ignition of the air-fuel mixture through ignition by the ignition device,
wherein the ignition control device controls the ignition device to perform ignition a plurality of times in one combustion cycle of the internal combustion engine, and
wherein the ignition control device adjusts an ignition interval of the ignition device in the one combustion cycle.

* * * * *